(12) United States Patent
Jennings et al.

(10) Patent No.: US 6,597,774 B1
(45) Date of Patent: Jul. 22, 2003

(54) SYSTEM AND METHOD FOR PROVIDING AN ALERT DURING COMMUNICATIONS

(75) Inventors: Teresa C. Jennings, Apex, NC (US); Robert J. Green, Wake Forest, NC (US)

(73) Assignee: Nortel Networks Limited, St. Laurent (CA)

( * ) Notice: Subject to any disclaimer, the term of this patent is extended or adjusted under 35 U.S.C. 154(b) by 241 days.

(21) Appl. No.: 09/593,630

(22) Filed: Jun. 13, 2000

(51) Int. Cl.[7] .............................................. H04M 15/00
(52) U.S. Cl. ............................. 379/114.07; 379/114.09; 379/114.17; 455/405
(58) Field of Search .......................... 379/111, 112.01, 379/114.01, 114.09, 114.14, 114.15, 114.16, 114.17, 114.19, 114.2, 114.24–114.25, 114.28, 120, 121.01, 126, 127.01, 133–134, 144.01; 455/405, 406

(56) References Cited

U.S. PATENT DOCUMENTS

| | | | | |
|---|---|---|---|---|
| 4,122,308 A | * | 10/1978 | Weinberger et al. | |
| 5,559,871 A | * | 9/1996 | Smith | |
| 5,950,126 A | * | 9/1999 | Palviainen et al. | |
| 6,178,231 B1 | * | 1/2001 | Nabkel | |
| 6,222,911 B1 | * | 4/2001 | Wyllie, III | |
| 6,226,364 B1 | * | 5/2001 | O'Neil | |

* cited by examiner

*Primary Examiner*—Duc Nguyen
(74) *Attorney, Agent, or Firm*—Withrow & Terranova, PLLC

(57) ABSTRACT

The present invention provides an alert to a user after a predetermined amount of time has elapsed for a particular communication. The timing for the alert may be set by the user at the beginning of each call, or may be automatically configured during the initiation of a call or communication. Control of the alert and the respective timing preferably occurs at a local call control center, such as a central office switch in the public telephone system, or a mobile switching center in a wireless system. For voice communications, the alert is preferably audible. Alternatively, for data communications, the alert is configured to effect an audible, visual, or otherwise perceptible alert on the user's interface.

19 Claims, 4 Drawing Sheets

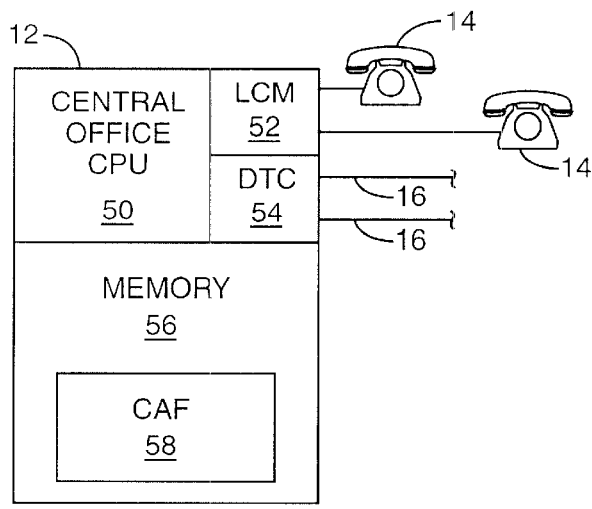
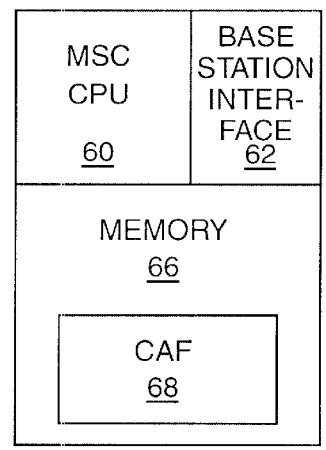
*FIG. 2A*  *FIG. 2B*
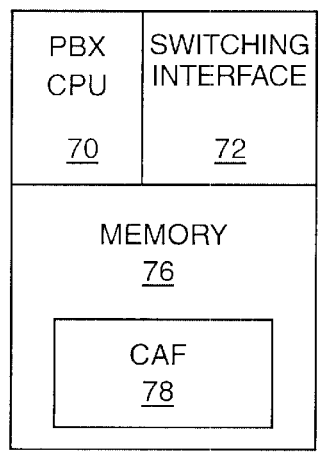
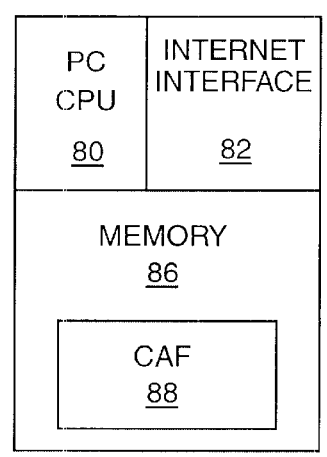
*FIG. 2C*  *FIG. 2D*

SYSTEM AND METHOD FOR PROVIDING AN ALERT DURING COMMUNICATIONS

FIELD OF THE INVENTION

The present invention relates to voice and data communications, and in particular, to providing an alert during such communications.

BACKGROUND OF THE INVENTION

Since the breakup of AT&T into regional telephone systems and the onslaught of alternative long distance carriers, competition between these carriers has lead to a multitude of pricing structures. A common scenario is to charge a fixed price for a first time period and a second, higher price after the end of the first time period. For example, a plan may charge one dollar for all calls up to 20 minutes and ten cents per minute for each minute the call extends past 20 minutes. For the customer to maximize value, he or she would like to talk for as close to 20 minutes as possible and avoid running over the initial 20-minute period where the calls effectively change from five cents per minute to ten cents per minute. Such time monitoring issues arise for voice and data communications over land-based and wireless communication networks.

Most phones do not have timers, and those that do typically do not provide easy access during operation and do not link to the call in progress. Further, there is no user-friendly way to systematically alert the caller that a certain amount of time has passed in order to optimize billing. Pre-paid calling cards provide an alert that time is expiring, but these alerts are not available for normal, unrestricted communications.

Therefore, there is a need for an alert to notify a user that a certain amount of time has elapsed for a given call. There is a further need for an alert that is configurable to assist the user in optimizing cost for any calling or communication plan.

SUMMARY OF THE INVENTION

The present invention provides a solution to the above by providing an alert to a user after a predetermined amount of time has elapsed for a particular communication. The timing for the alert may be set by the user at the beginning of each call, or may be automatically configured during the initiation of a call or communication. Control of the alert and the respective timing preferably occurs at a local call control center, such as a central office in the public telephone system, or a mobile switching center in a wireless system. For voice communications, the alert is preferably audible. Alternatively, for data communications, the alert is configured to effect an audible, visual, or otherwise perceptible alert on the user's interface.

In a preferred configuration for voice communications, the user goes off-hook and dials a feature access code (FAC) associated with an audible alert timer. The feature access code may select a predefined time or may be configured to prompt the customer to enter a desired time. Once the time for an alert is set, the user is provided a dial tone to initiate a call. The call is set up and the timer begins counting. After the predetermined amount of time expires, the user hears either a special tone or announcement indicating that the amount of time has expired. The user can then choose to remain connected or hang up. The system may be modified to provide a preliminary warning that the time will expire within a selected amount of time.

Enhancements to the basic functionality of the present invention include providing a default alert time for a specific user, remembering the timer setting for a previous call, or tying the timer setting to a specific carrier or carrier plan. In the latter, dialing a carrier access code (CAC), such as 10-10-555, may provide a first timer setting, wherein another carrier access code may provide a different timer setting depending on the calling plan and billing structure. Other aspects and features of the present invention will become apparent to those of ordinary skill in the art upon reviewing the following description of the specific embodiments of the invention in conjunction with the accompanying figures.

BRIEF DESCRIPTION OF THE DRAWING FIGURES

FIGS. 2A, 2B, 2C and 2D are block representations of call and data transmission control systems.

DETAILED DESCRIPTION OF THE PREFERRED EMBODIMENTS

Figure 1:
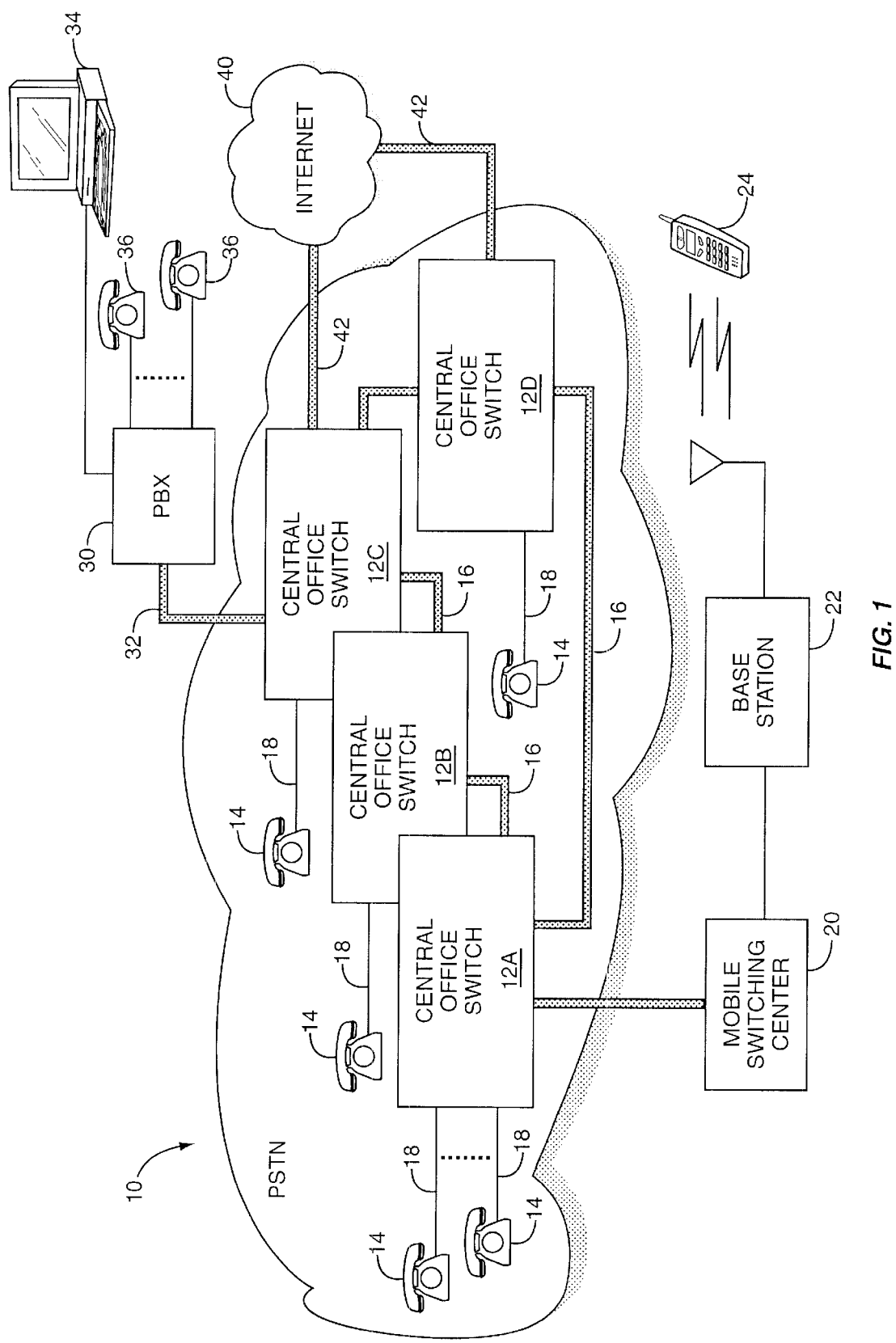
FIG. 1 is a block representation of a communication network.

The present invention provides an alert to users of a telephone or data network after a predefined amount of time to monitor call length, and preferably, optimize use of the plan based on a carrier or service provider's billing structure. FIG. 1 provides a simplified illustration of a telephony network providing data and voice communications over land-based or wireless systems. As shown, the telephony network 10 includes a traditional, public switched telephone network (PSTN) and a variety of systems connecting thereto. For the sake of conciseness, the common channel signaling network carrying the control signaling messages for the PSTN and wireless network is not shown.

The PSTN, operated by a combination of local carriers and interexchange carriers, includes a number of central office switching systems 12A–12D. A number of subscriber stations, depicted as telephones 14, are connected to the central office with switches 12A–12D via telephone lines 18. The central office switches 12A–12D may be connected to one another using trunk circuits 16 that carry traffic between the central office switches. The central office switches 12A–12D may act as end offices for subscribers directly coupled to that office as well as tandem offices when providing connection between offices.

A wireless network is shown coupled to a central office switch 12A via a mobile switching center 20, which provides the necessary switching and call processing functions for mobile communications. Mobile communications are facilitated using a base station 22 that provides wireless communications to mobile terminals 24, such as cellular telephones.

A private branch exchange (PBX) 30 may provide local communication and switching functions for an organization. The PBX 30 is shown coupled to a central office switch 12C via a trunk 32. The PBX 30 facilitates communications between computers 34 and local telephones 36. The PBX 30 also facilitates local call processing and provides the interface for the organization to the PSTN 10.

The Internet 40 may also interface with the PSTN through one or more central office switches, such as central office switches 12C and 12D via trunks 42. Those skilled in the art will recognize that additional networks and systems may couple to the PSTN. The systems and networks depicted in FIG. 1 are provided simply to convey to those of ordinary skill in the art that the present invention is applicable throughout telephone and data communication systems, and may be implemented in a variety of places and devices within these systems.

Numerous devices and systems are capable of providing an alert for a call or data communication session after a set period of time. These devices and systems typically include a communication interface capable of effecting a communication session between parties. FIGS. 2A–2D depict the basic structure of a central office switch 12, a mobile switching center 20, a PBX 30, and a personal computer 34, respectively. These systems are exemplary of those capable of operation according to the present invention. The above list is not comprehensive, and those skilled in the art will recognize other systems and combinations thereof that may be configured according to the invention. For the purposes of describing the preferred embodiment of the invention, providing the alert after a predetermined amount of time is assumed to be defined in a call access feature (CAF). In general, the call access feature operates to set a software or hardware timer and to provide an alert when the timer expires.

FIG. 2A depicts a central office switch 12 having a CPU 50 controlling a line concentration module (LCM) 52 and a digital trunk controller (DTC) 54. The LCM 52 facilitates connections to one or more subscribers 14, while the DTC 54 controls connections and traffic over the various trunks 16. Importantly, the CPU 50 includes memory 56 and is capable of providing a call access feature 58. Preferably, the central office switch 12, when acting as an end office for a particular subscriber, will provide the call access feature of the present invention to direct subscribers.

Similarly, the mobile switching center 20 includes a CPU 60 and a base station interface 62 for facilitating wireless communications. The CPU 60 is associated with memory 66 and is capable of providing a call access feature 68. Again, the local MSC 20 preferably provides the timer and alert functionality to wireless users serviced by the mobile switching center.

The PBX 30 preferably includes a CPU 70 and a switching interface 72 for effecting connections within the private exchange. The CPU includes memory 76 and provides the call access feature 78 for users within the private exchange. The call access feature of the present invention is equally applicable to data communications and may be effected on a personal computer 34, work station or server. The personal computer 34 will include a CPU 80 and an Internet or network interface 82. The interface may run through a PBX 30 or may provide a direct or indirect connection to the Internet through one or more networks. The CPU 80 includes memory 86 and is capable of effecting the call access feature 88.

Figure 3:
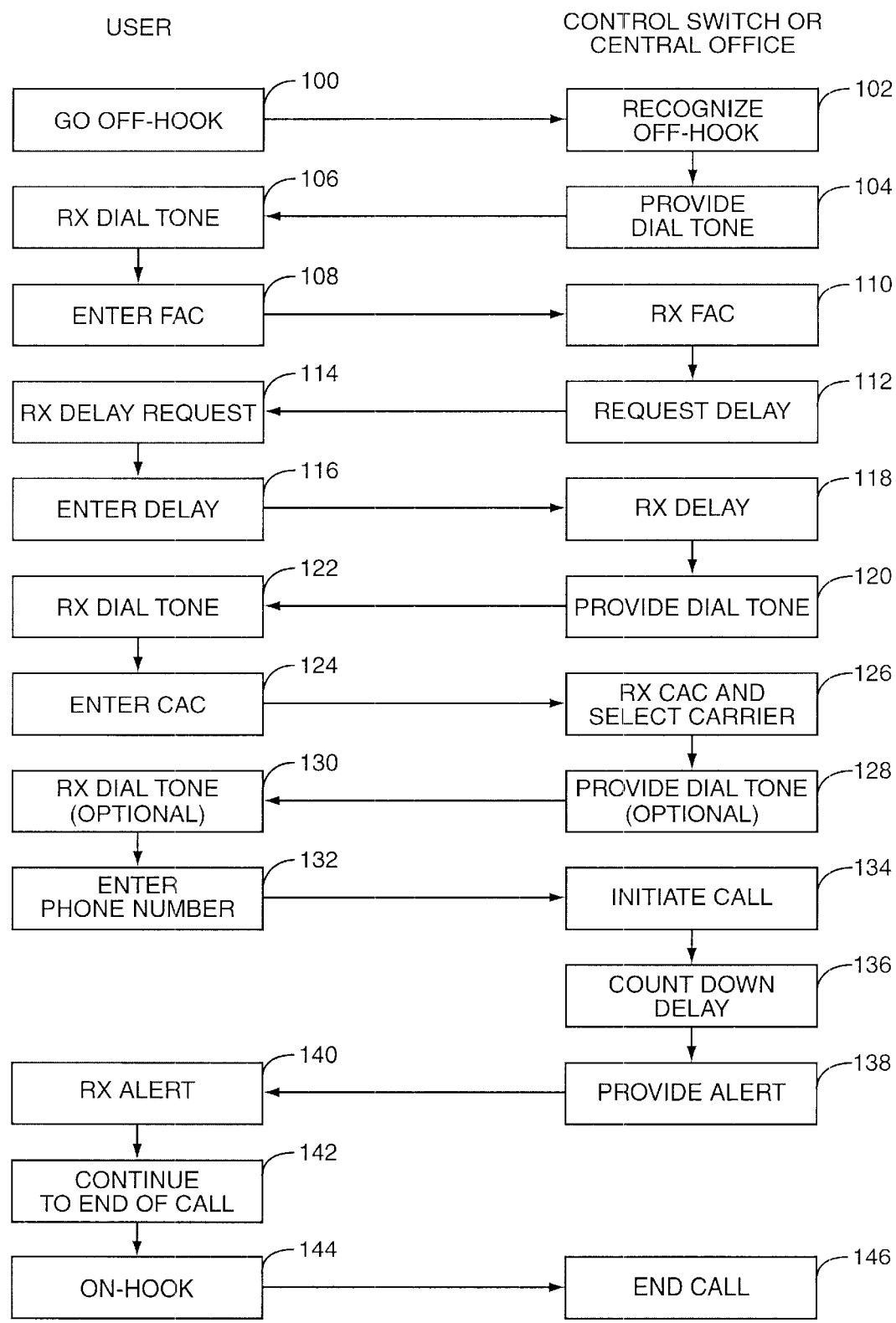
FIG. 3 is a flow chart outlining a first exemplary process according to the present invention.

Although any of the above systems can implement the call access feature of the present invention, the invention is best understood when a central office switch 12A–12D acting as an end office for a specific telephone subscriber is configured to provide the call access feature. Further, the subscriber making the call and using the call access feature is referred to as the user. The first exemplary embodiment is described in reference to FIG. 3. In this embodiment, the user activates the call access feature and sets the length of the timer when a call is initiated.

Initially, the user picks up the telephone by taking the phone off-hook (block 100). The central office switch 12A recognizes the user as going off-hook (block 102) and provides a dial tone (block 104). The user receives the dial tone (block 106) and enters a feature access code (FAC) (block 108), such as *999, to select the call access feature for setting a call timer. The central office receives the feature access code (block 110). Preferably, the central office is configured to allow the user to select the appropriate delay or time setting, since different carriers have different billing plans with different time periods before the change in billing rate occurs. Thus, the central office requests a delay (block 112) by providing an automated message, "Please enter the number of minutes to wait before notification in five-minute intervals, followed by the pound key." The user will receive the delay request (block 114) and enter the delay as instructed (block 116). The delay may be set in any manner. The five-minute interval in the example is merely illustrative of the innumerable options and configurations available.

The central office will receive the delay from the user (block 118) and provide a dial tone (block 120). The user will receive the dial tone (block 122), and preferably, enter a carrier access code (CAC) to select a carrier providing a desired billing structure (block 124). Current carrier access codes are seven-digit numbers used to instruct the central office to select an appropriate long-distance carrier. The invention is equally applicable to local calling plans, as well as to local and long-distance data communications.

The central office will receive the carrier access code, select the proper carrier (block 126), and optionally provide the requisite dial tone to the user (block 128). If a dial tone is provided, the user will receive the dial tone (block 130) and enter the desired phone number (block 132). Preferably, the call access code and number to be dialed are entered in succession without an intervening dial tone. The central office will initiate the call using the selected carrier (block 134) and begin counting down for the requested delay (block 136).

Assuming the call is still in progress, once the call has lasted the length of the requested delay an alert is provided to the user (block 138). The alert is preferably an audible tone or announcement to the effect, "Your 20 minutes have expired." Alternatively, the alert may be a preliminary warning indicating the requested delay will occur within a preset time, for example, the announcement may include, "Your 20 minutes will expire in one minute," or "Your call has lasted 19 minutes." A combination of a preliminary warning followed by a message that the time has expired is equally applicable.

The user will receive the one or more alerts (block 140) and continue conversing until the call is ended (block 142). The user will preferably end the call by hanging up the phone, thus going on-hook (block 144). The central office will recognize that the user has gone on-hook and end the call (block 146).

Figure 4:
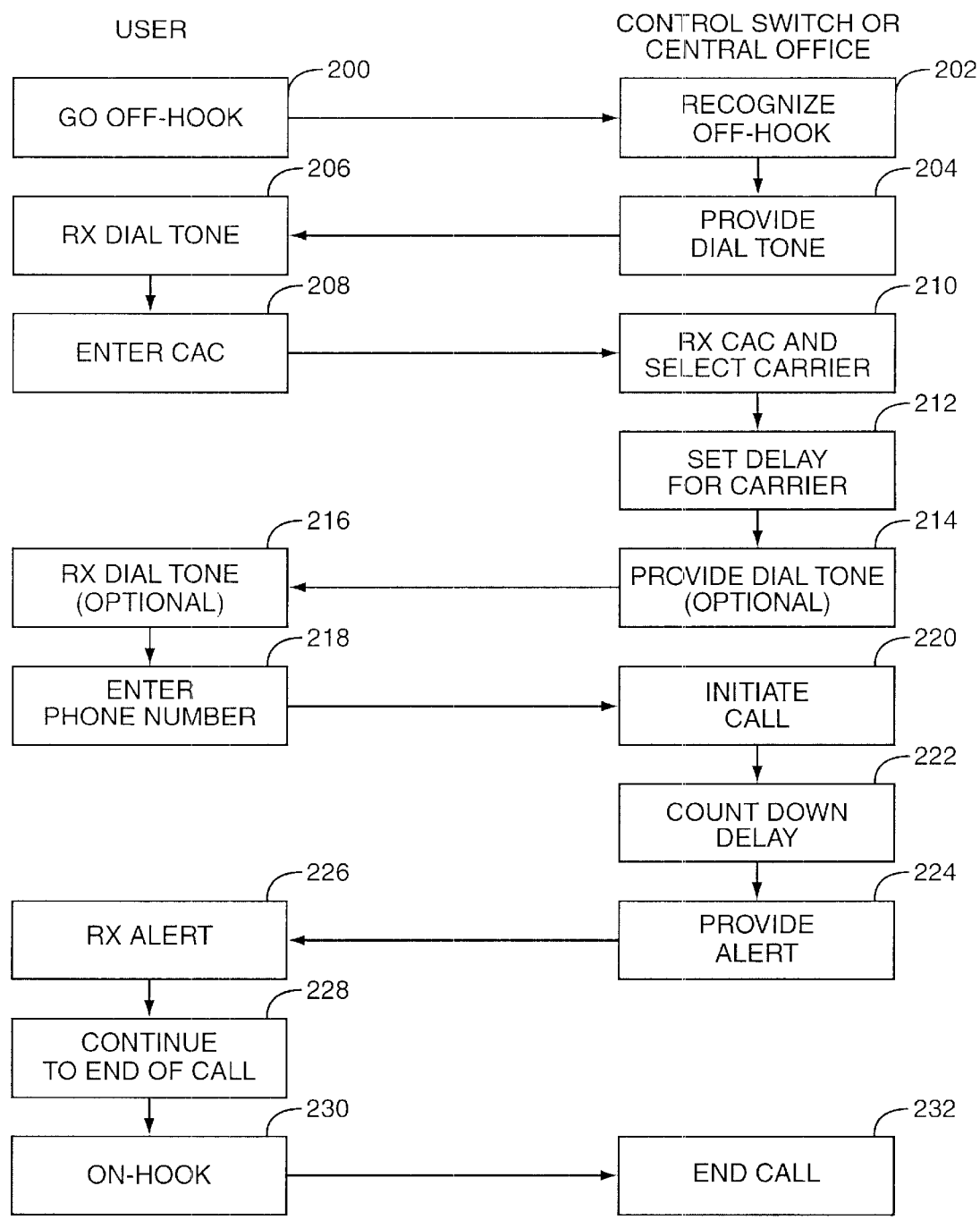
FIG. 4 is a flow chart outlining a second exemplary process according to the present invention.

An alternative exemplary embodiment is outlined in FIG. 4. In this embodiment, the central office or other call control system automatically initiates the call access feature upon initiation of a call, and preferably, upon entry of a carrier access code. In this embodiment, the central office may configure varying delays and alerts depending on the selected carrier corresponding to the carrier access code. This is especially useful when one carrier changes rates after one length of time, while another carrier changes rates after a different length of time.

Initially, the user will go off-hook (block 200) wherein the central office will recognize that the user has gone off-hook (block 202). A dial tone is provided (block 204) and received by the user (block 206). The user will enter a carrier access code (block 208), and the central office will receive the carrier access code and select the proper carrier (block 210). Preferably, the central office will automatically incorporate the call access feature by setting a delay for the selected carrier (block 212) and, optionally, provide a dial tone to the user (block 214). The user will receive the dial tone (block 216) and enter the desired phone number (block 218). As noted above, the preferred implementation accepts the call access code and number in succession without an intervening dial tone.

The central office will initiate the telephone call based on the phone number (block 220) and begin counting for the selected delay (block 222). After the call has lasted the length of the selected delay, an alert is provided to the user (block 224). The user will receive the alert (block 226) and determine whether or not to end the call. The user will end the call (block 228) by going on-hook (block 230), which signals the central office that the call has ended. The central office will then end the call (block 232).

A variation on these embodiments may include allowing the central office to store the delay setting used for the last call or last carrier used. As such, the central office would necessarily provide the user with an option to override the default if a change is desired.

During data communications, the corresponding control system providing the call access feature may be configured to provide various types of warnings that will not affect data transmission. For example, the controlling system may send a message to the user's PC that triggers a message window indicating that a set amount of time has elapsed. A similar interface may be used to set the delay for the call access feature.

Importantly, the call access feature may be implemented on various systems and equipment throughout telephone and data transmission networks. Functionality may be shared across systems and networks. Although the preferred embodiment incorporates the local switching system controlling attached subscribers and users, intermediate devices, such as a tandem switch, may be used to provide call access features to subscribers directly coupled to another end office. As in the case of a PBX or like equipment, the call access feature may be provided outside of the public switched telephone network in any environment where users may enjoy an alert to monitor time of calls or connections.

Those skilled in the art will recognize other modifications and improvements to the preferred embodiments described above. These modifications and improvements are considered within the scope of the disclosure and the following claims.

What is claimed is:

1. A system for providing a delayed alert comprising:
   a) a communication interface; and
   b) a control system having a timer and operatively associated with said communication interface, said control system adapted to:
      i) facilitate a telecommunication connection from an originating party to a receiving party via said communication interface;
      ii) set said timer with a predefined delay upon establishing the telecommunication connection between the originating party and the receiving party;
      iii) provide an alert to the originating party when the predefined delay expires to inform the originating party of a predetermined passage of time;
      iv) receive a carrier access code indicative of a desired carrier to use fo telecommunication connection and to initiate said delay upon receiving said carrier access code; and
      v) initiate said predefined delay based on the selected carrier wherein each one of a plurality of carriers is associated with a unique predefined delay such that said alert is configured for a specific carrier.

2. A system for providing a delayed alert comprising:
   a) a communication interface; and
   b) a control system having a timer and operatively associated with said communication interface, said control system adapted to:
      i) facilitate a telecommunication connection from an originating party to a receiving party via said communication interface;
      ii) receive one of a plurality of feature access codes from the originating party;
      iii) set said timer with a unique predefined delay associated with said one of a plurality of feature access codes upon establishing the telecommunication connection between the originating party and the receiving party; and
      iv) provide an alert to the originating party when the unique predefined delay expires to inform the originating party of a predetermined passage of time.

3. The system of claim 2 wherein said control system is further adapted to receive said predefined delay from the originating party via said communication interface.

4. The system of claim 3 wherein said control system is further adapted to signal the originating party to enter said predefined delay upon receiving said feature access code.

5. The system of claim 4 wherein said control system is further adapted to receive a carrier access code upon receipt of said predefined delay and to facilitate selection of a carrier based on said carrier access code for said telecommunication connection.

6. The system of claim 1 wherein said predefined delay corresponds to an end of a period having a first billing rate.

7. The system of claim 1 wherein said predefined delay is less than an end of a period having a first billing rate, such that said alert is a warning that the end of the period having the first billing rate is near.

8. The system of claim 1 wherein said predefined delay substantially equals a period having a first billing rate, such that said alert is a warning that the end of the period having the first billing rate has ended.

9. The system of claim 6 wherein said control system is further adapted to provide, to the originating party, a first alert prior to an end of the period having a first billing rate, such that said first alert is a warning that the end of the period having the first billing rate is near and a second alert at the end of the period having the first billing rate such that said second alert is a warning that the end of the period having the first billing rate has arrived.

10. The system of claim 1 wherein said alert is an audible alert capable of being heard by the originating party.

11. The system of claim 10 wherein said alert consists of the group consisting of a tone and series of tones.

12. The system of claim 10 wherein said alert is a message bearing on said predefined delay.

13. The system of claim 1 wherein said alert is capable of being used by a device used by the originating party in said telecommunication connection to signal the originating party that the predefined delay has expired.

14. A telephone switch comprising the system of claim 1 wherein said communication interface is adapted to receive a telephone subscriber line coupled to a telephone of the originating party, said telecommunication connection being a telephone call.

15. A telephone switch comprising the system of claim 1 wherein said communication interface is adapted to receive signals from a second switch associated with a telephone of the originating party, said telecommunication connection being a telephone call.

16. A mobile switching device comprising the system of claim 1 wherein said communication interface is adapted to receive signals from a mobile terminal via a base station, said telecommunication connection being partly a wireless connection.

17. An exchange device comprising the system of claim 1 wherein said communication interface is adapted to receive a telephone line coupled to a telephone of the originating party, said telecommunication connection being a telephone call.

18. A computer readable medium comprising software adapted to:

facilitate a telecommunication connection from an originating party to a receiving party via a communication interface;

set a timer with a predefined delay upon establishing the telecommunication connection between the originating party and the receiving party;

provide an alert to the originating party when the predefined delay expires to inform the originating party of a predetermined passage of time;

receive a carrier access code indicative of a desired carrier to use for said telecommunication connection and to initiate said delay upon receiving said carrier access code; and initiate said predefined delay based on the selected carrier wherein each one of a plurality of carriers is associated with a unique predefined delay such that said alert is configured for a specific carrier.

19. A computer readable medium comprising software adapted to:

facilitate a telecommunication connection from an originating party to a receiving party via said communication interface;

receive one of a plurality of feature access codes from the originating party;

set a timer with a unique predefined delay associated with said one of a plurality of feature access codes upon establishing the telecommunication connection between the originating party and the receiving party; and provide an alert to the originating party when the unique predefined delay expires to inform the originating party of a predetermined passage of time.

* * * * *